Dec. 13, 1938.   W. T. KNUDSON   2,139,962
CORN HARVESTER
Filed March 2, 1936    4 Sheets-Sheet 2
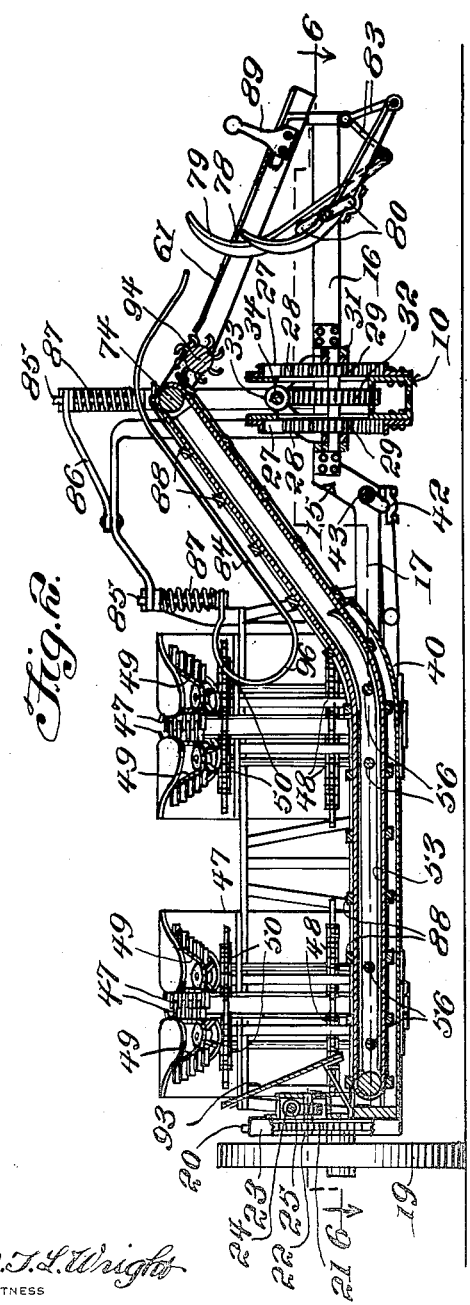
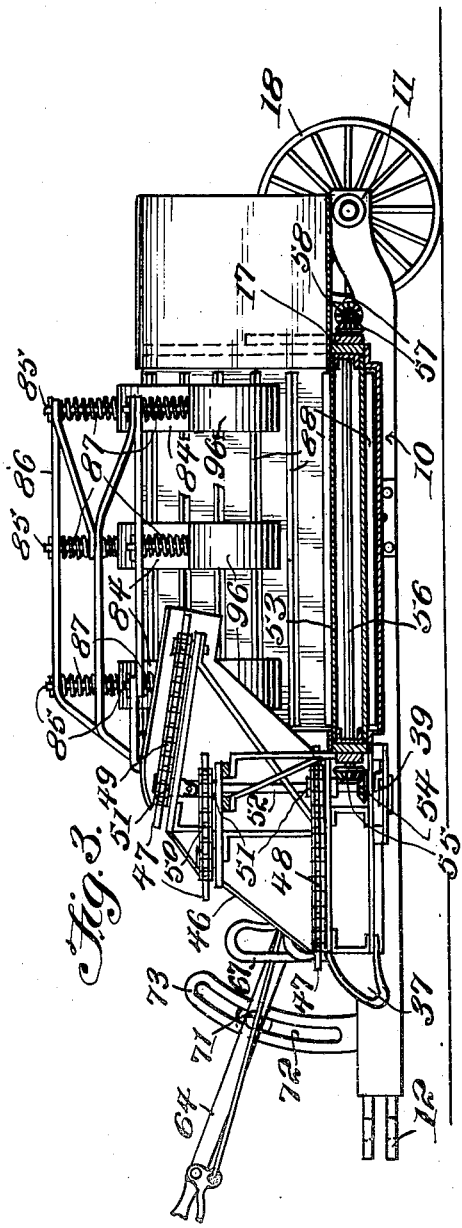
Witfred T. Knudson
INVENTOR
BY Victor J. Evans & Co.
ATTORNEY

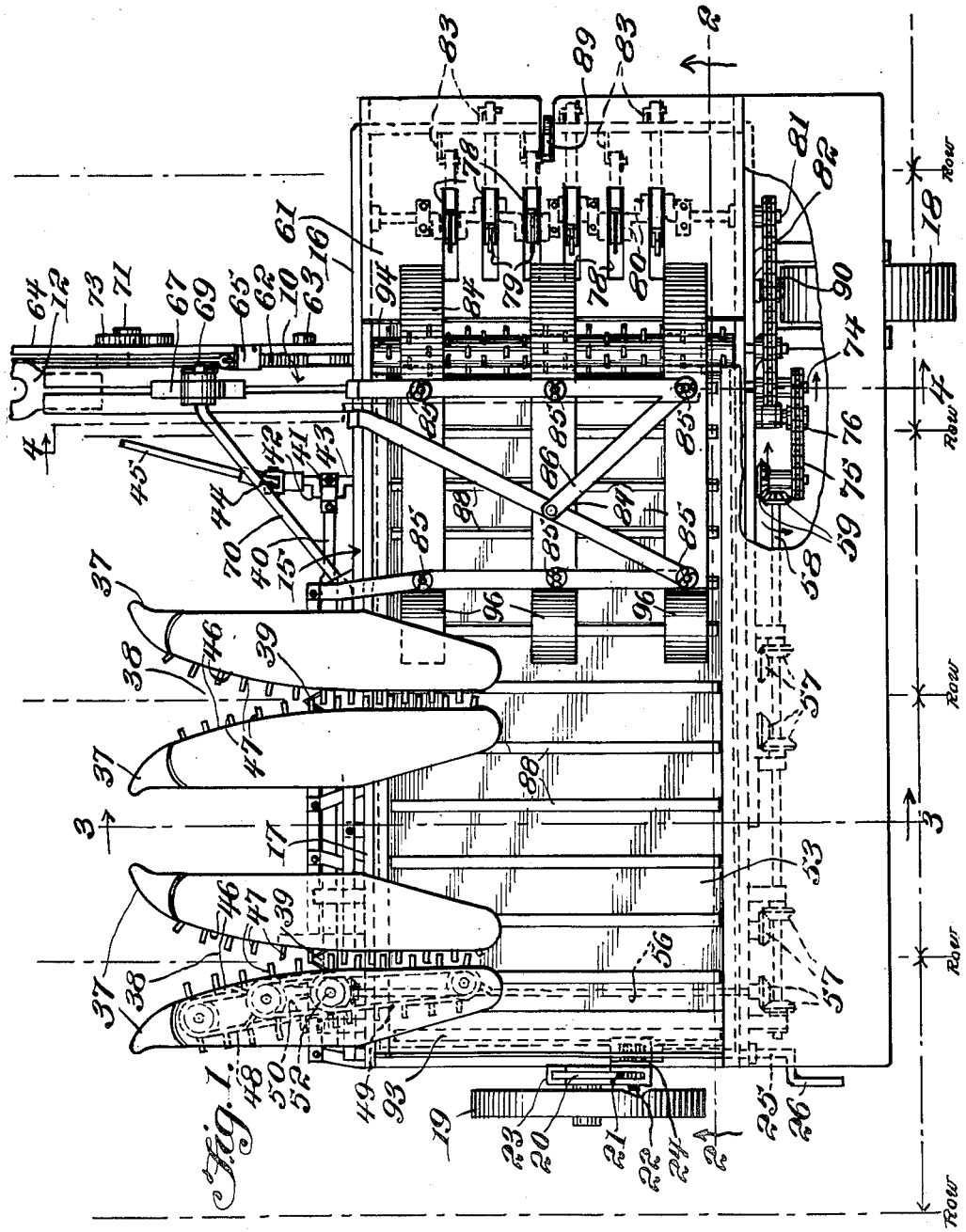

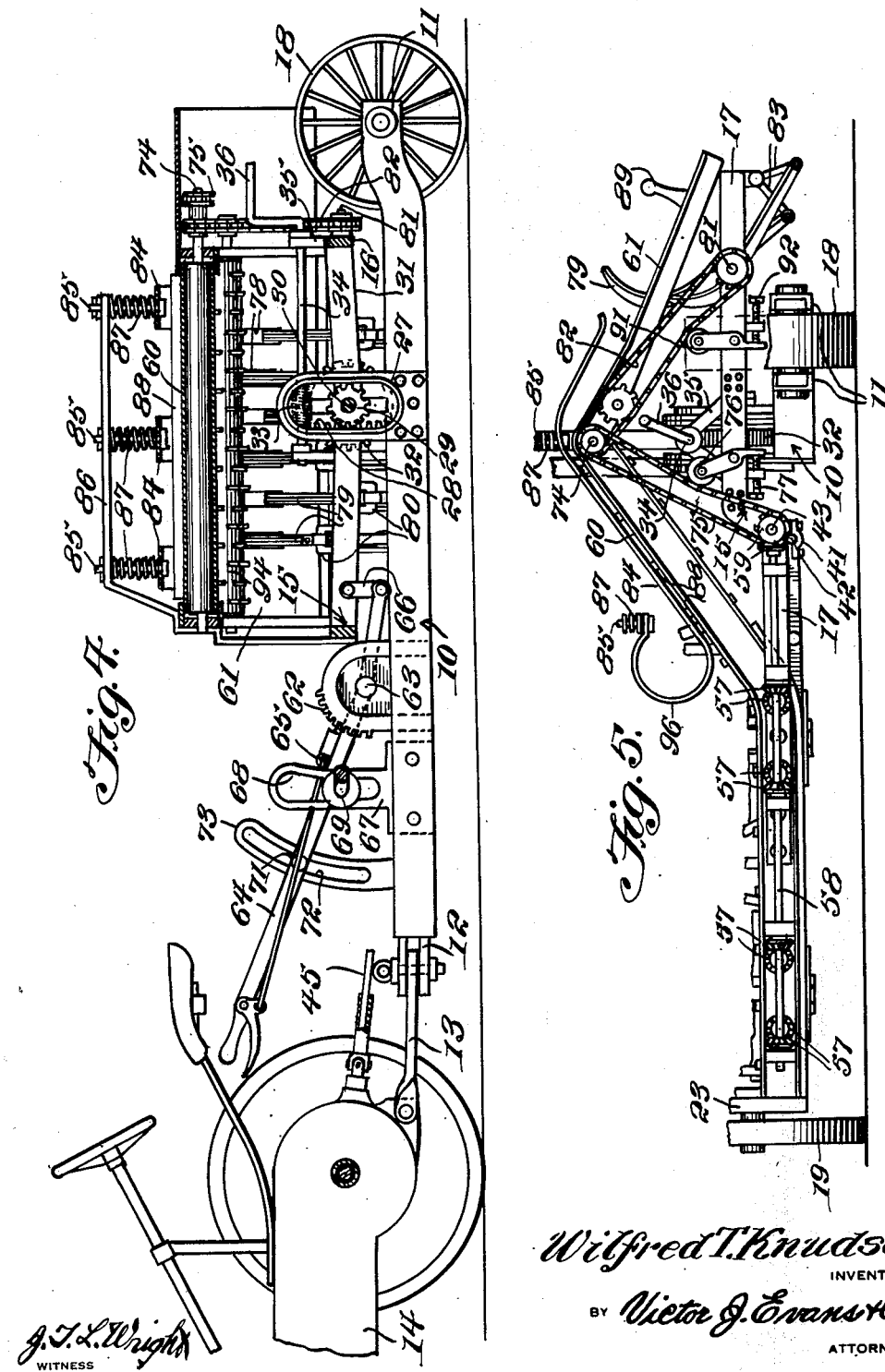

Dec. 13, 1938.　　　W. T. KNUDSON　　　2,139,962
CORN HARVESTER
Filed March 2, 1936　　　4 Sheets-Sheet 4
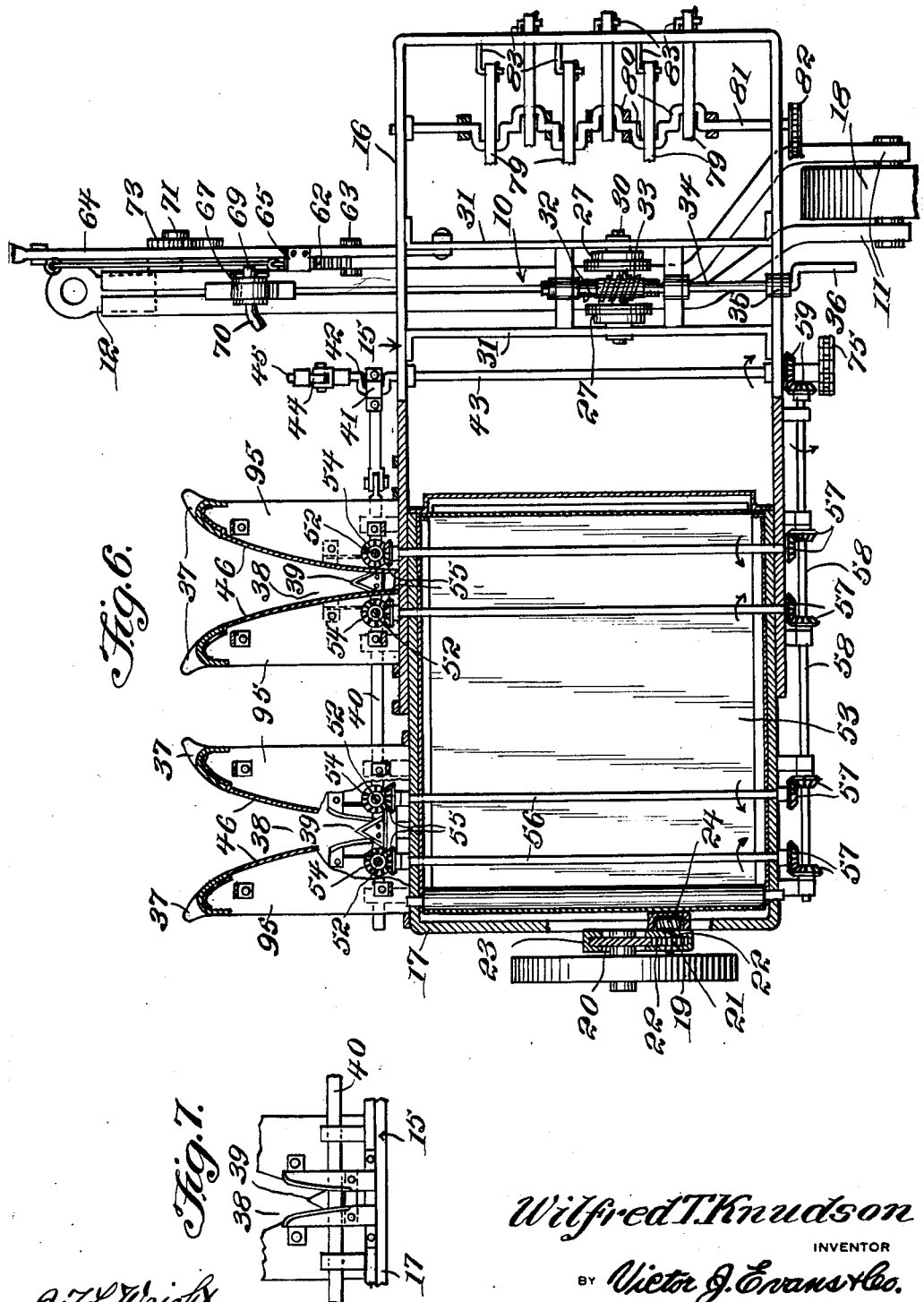
Wilfred T. Knudson
INVENTOR
BY Victor J. Evans & Co.
ATTORNEY Patented Dec. 13, 1938

2,139,962

UNITED STATES PATENT OFFICE 2,139,962

CORN HARVESTER

Wilfred T. Knudson, Montrose, S. Dak.

Application March 2, 1936, Serial No. 66,742

2 Claims. (Cl. 56—312)

The invention relates to a harvester and more especially to a corn harvester.

The primary object of the invention is the provision of a harvester of this character, wherein growing corn in several rows in a field can be cut and conveyed to packers so that the stalks will be automatically bundled for the binding of the same into bundles and thus the harvesting of corn being accomplished so that no manual handling of the crop is required up to the time the bundles are deposited upon the ground.

Another object of the invention is the provision of a harvesting machine of this character, wherein several rows of growing corn stalks can be effectively cut, gathered and bundled in a single operation of the machine and the bundled stalks automatically discharged onto the ground, the cutting mechanism and the transporting frame for the gathering of the cut stalks of corn being readily adjustable to vary the line or plane of cut so that the growing stalks may be cut close to the ground or at the desired distance removed therefrom and thereby varying the length of the stalk according to the height of the growing corn.

A further object of the invention is the provision of a machine of this character, wherein the construction thereof is novel in form in that the transporting frame is adjustable relative to the draft frame or beam of the harvester and efficient gathering, packing and bundling of a crop of growing corn is assured when the machine is drawn through a field and as stated several rows of corn will be harvested during the draft of the machine.

A further object of the invention is the provision of a machine of this character, which is comparatively simple in its construction, thoroughly reliable and efficient in its operation, readily and easily handled in that it is susceptible for control by a single operative, sturdy in build, durable, and comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a machine constructed in accordance with the invention, portions thereof being broken away to show details.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a sectional view on the line 4—4 of Figure 1 looking in the direction of the arrows.

Figure 5 is a fragmentary rear elevation.

Figure 6 is a sectional view on the line 6—6 of Figure 2 looking in the direction of the arrows.

Figure 7 is a fragmentary bottom plan view showing the sickle blade operating at the throat between the gathering points of the harvester.

Similar reference characters indicate corresponding parts throughout the several views in the drawings.

Referring to the drawings in detail, the harvesting machine constituting the present invention comprises a draft frame 10 having a forked laterally offset rear end 11 and a front hitch end 12, respectively, the latter through the medium of a hitch 13 is connected with a draft tractor 14, only a portion thereof being shown, and this functioning as a power unit for the harvester.

Overlying the frame 10 and protruded laterally to opposite sides thereof is the body frame 15 of the harvester, it having a raised horizontal portion 16 which lies in a horizontal plane above the remaining gathering and transporting portion 17 of said body frame. The forked rear end 11 of the draft frame 10 has journaled therein a rear supporting wheel 18 while the body frame 15 at the end of the portion 17 which extends a considerably greater distance laterally of the frame 10 than does the portion 16 has adjustable connection with a side supporting wheel 19, its axle spindle being connected with a rack 20 meshing with a rack gear 21, its arbor 22 being fixedly journaled in the guide 23 for said rack 20 and carries a worm gear 24 on an operating stem 25 which projects rearwardly of said frame 15 and terminates in a hand crank 26 so that it may be manually handled for the raising and lowering of the frame 15 at the end next to the wheel 19.

On the frame 10 is an upstanding bearing 27 in the form of a loop having internally thereof a rack 28 with which meshes a rack gear 29, its arbor 30 being journaled in a cross brace 31 of the frame 15 and also has fixed thereto a worm gear 32 meshing with a worm screw 33 on a stem 34 suitably journaled in supports 35 on the frame 15. This stem 34 is carried rearwardly of the frame 15 and terminates in a hand crank 36 for manual manipulation. Thus it will be seen that by operating this stem 34 the frame 15 can be raised and lowered at that portion above the frame 10.

Arranged forwardly of the frame 15 and carried thereby are the spaced pairs of spaced gathering points 37 having between each pair a throat 38 for the passage of standing stalks therethrough. Intersecting the throats 38 between said points 37 are the cutting blades 39 of a sickle bar 40, it having coupling connection 41 with the crank 42 of a driven shaft 43, the latter through a universal connection 44 and power shaft 45 is operated from the power mechanism of the tractor 14. The blades 39 when the sickle bar 40 is reciprocated through the crank 42 will sever the standing stalks entering the throat 38 between the points 37.

Operating through the facings 46 for the throats 38 of the points 37 are the gathering prongs 47 of lower, upper and intermediate endless gathering chains 48, 49 and 50, respectively, these being operated from driving sprockets 51 common to shafts 52 which are journaled vertically in any suitable manner within the points 37, the upper chain 49 being rearwardly inclined so as to cast the severed stalks onto a transporting conveyor 53 in the frame 15, the said conveyor being hereinafter more fully described.

The shafts 52 at their lower ends carry beveled gears 54 meshing with companion gears 55 on driven shafts 56, these through gear connections 57 and the shaft 58 and the gear connections 59 with the shaft 43 operate the said chains simultaneously with each other, the said shaft 43 being the power shaft for the harvester.

The conveyor 56 includes an elevator run 60 laterally inclined and leading to a combined packing and binding platform or shelf 61 which is reversely inclined to the elevator run 60 for the delivery of bundled stalks onto the ground laterally from the machine.

On the draft frame 10 forwardly of the body frame 15 is a segmental rack 62 having pivoted thereto at 63 a tilting lever 64, it carrying a hand release latch 65 engageable with the rack 62 so that this lever may be locked in adjusted position. The lever 64 through the link connection 66 operates the body frame 15 for the tilting thereof so that growing stalks in the harvesting thereof may be cut at varying heights with respect to the ground, the lever 64 being manually controlled for this purpose.

The draft frame 10 also carries a casting 67 having the guideway 68 therein for a movable part 69 of a brace rod 70 which is joined with the body frame 15 and is disposed diagonally in a lateral direction from the line of draft of the draft frame 10 so as to maintain the relationship of these frames 10 and 15 with respect to each other in the operation of the machine.

The lever carries a slide 71 operating in an arcuate slot 72 in a guide 73 fixed to and rising from the frame 10 and in this manner the load upon the lever 64 is relieved under adjustment of the body frame 15. The body frame 15 is set at the proper elevation by actuating the hand cranks 26 and 36, respectively, and in this manner the said body frame can be originally set at the required level.

The conveyor 53 at the elevator run 60 thereof is driven by a shaft 74 operated from a sprocket and chain connection 75 driven from the power shaft 43, the chain of this connection 75 being acted upon by a chain tightener 76 which is adjustable by a setting screw 77, the tightener 76 being supported on the body frame 15 and likewise the set screw 77 is carried thereby.

Working through suitable clearances 78 provided in the shelf or platform 61 are packer arms 79, these being operated through cranks 80 of a shaft 81, it having chain and sprocket connections 82 with the shaft 74, the packer arms 79 being also connected with swinging links 83 pivoted to the portion 16 of the body frame 15 so that proper packing movements will be assured to the arms whereby the latter will pack the severed stalks delivered onto the shelf or platform 61 into bundles for the bundling of these stalks and the binding thereof, the binding mechanism being not shown and the same can be of any standard type employed in grain and corn harvesting machines.

Overhanging the elevator run 60 and extending over the shelf or platform 61 for a distance are spring tensioned stalk guides 84, these being supported by hanger bolts 85 carried in supports 86, the bolts being surrounded by coiled tensioning springs 87 and the said supports are carried in proper position upon the body frame 15. Thus the guides 84 straighten the cut stalks when traveling the elevator run 60 from the transporting conveyor 53, the latter having the lifts 88 thereon and these are of conventional kind.

Carried by the platform or shelf 61 and cooperating with the packers 79 is a bundle trip 89 which is normally held in retaining position for the bundled stalks by a spring (not shown) which resets the trip when a bundle is discharged thereby from the shelf or platform 61 onto the ground at one side of the machine. The chain of the connections 82 has operating therewith a tightener 91 which is adjusted by a set screw 92 and this tightener is carried by the body frame 15 which also carries the set screw 92.

At the end of the portion 17 of the body frame next to the wheel 19 is a shield or guard 93 which prevents the severed stalk of corn from falling from the body frame against the wheel 19 when the machine is in operation. This shield or guard also causes the severed stalks to fall onto the transporting conveyor 53 whence the latter will elevate these stalks and deposit the same onto the shelf or platform 61 for the packing and bundling thereof as well as the binding of such stalks into the proper sized bundles.

Arranged between the elevator run 60 and the shelf or platform 61 is a toothed roller 94 which functions to feed the stalks from the elevator run onto the said shelf or platform into position to be acted upon by the packer arms 79 during the working of the machine. The lower and intermediate gathering chains 48 and 50 are arranged horizontally in spaced parallel relation to each other while the upper gathering chain 49 is rearwardly inclined so that the severed stalks gathered by the chains 48 and 50 will be acted upon by the chain 49 to cast the said stalks downwardly onto the conveyor 53, the walling of the points being indicated at 95 which also includes the facings 46, the heels of the said points 37 being extended well over the conveyor 53 for the delivering of the severed stalks directly onto the latter from the gathering throats 38 between the points 37 through the instrumentality of the gathering chains hereinbefore mentioned.

The guides 84 at their ends next to the lowermost portion of the elevator run 60 are formed with the upwardly curled terminals 96 to allow the free passage of the severed stalks on the conveyor 53 beneath said guides when traveling the elevator run 60 for the positive delivery of such stalks onto the shelf or platform 61.

What is claimed is:

1. A machine of the character described, comprising a draft frame, a supporting wheel journaled at the rear end of said frame, a hitch at the forward end thereof, a body frame, a supporting wheel at one end of the body frame, means for raising and lowering the frames with relation to each other, means for tilting the body frame, pairs of spaced gathering points on the body frame and forming throats therebetween, gathering means working within said throats, a transporting conveyor on said body frame and having an elevator run, a bundling platform on the body frame next to said elevator run, packing arms movably working through said platform, tensioned guides overhanging the elevator run, cutters movable transversely of the throats between said points, a shiftable brace between said frames, a draft unit connected with the hitch of the draft frame and having driving connections with the cutters, conveyor and packer arms, a bundle trip on said platform for coacting with the packer arms, supports on said body frame and having yieldable hanger connections with the guides, and a toothed feed roller between the elevator run and the said platform for delivering cut material upon the latter from said run, the upper portion of the gathering means being inclined toward the conveyor.

2. A machine of the character described comprising a draft frame, a body frame, a supporting wheel at one end of the body frame, means for raising and lowering the body frame with respect to said wheel, means for raising and lowering the body frame with relation to the draft frame without changing the angular relation between said frames, means for tilting the body frame with respect to the draft frame, pairs of spaced gathering points on the body frame and forming throats therebetween, a conveyor mounted on said body frame and having an elevator run, and gathering means working within the throats between the gathering points and having a portion overlapping a portion of the conveyor and inclined toward said conveyor.

WILFRED T. KNUDSON.